Nov. 3, 1964 J. A. BRADFORD 3,155,183
BAGGING MACHINE
Filed April 6, 1962 2 Sheets-Sheet 1
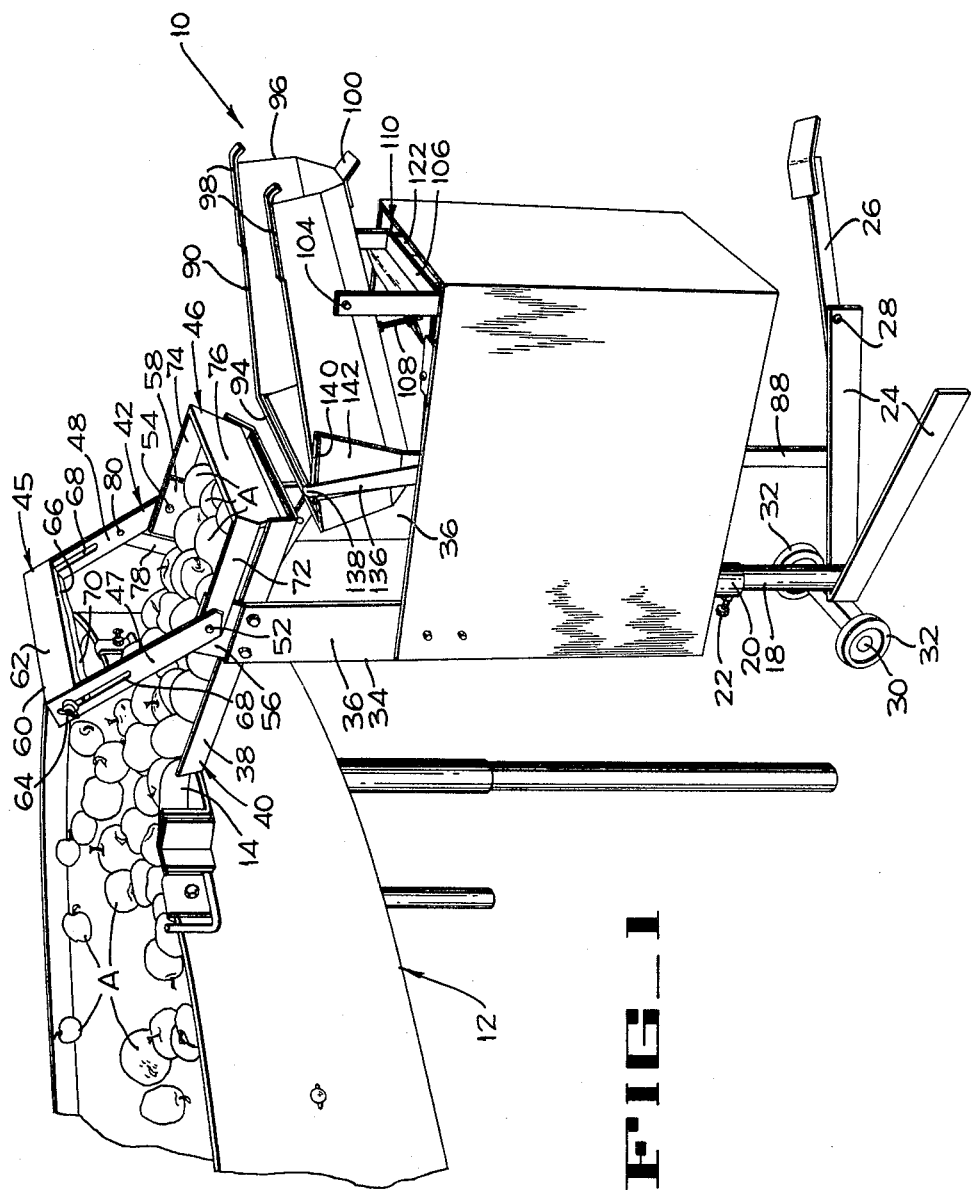
FIG_1
INVENTOR
JOHN A. BRADFORD
BY *Hans G. Hofmeister*
ATTORNEY Nov. 3, 1964
J. A. BRADFORD
3,155,183
BAGGING MACHINE
Filed April 6, 1962
2 Sheets-Sheet 2
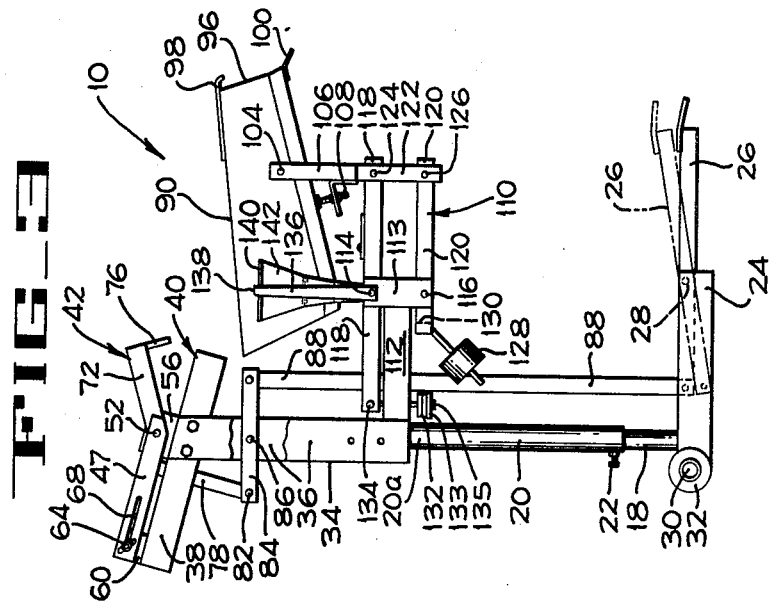
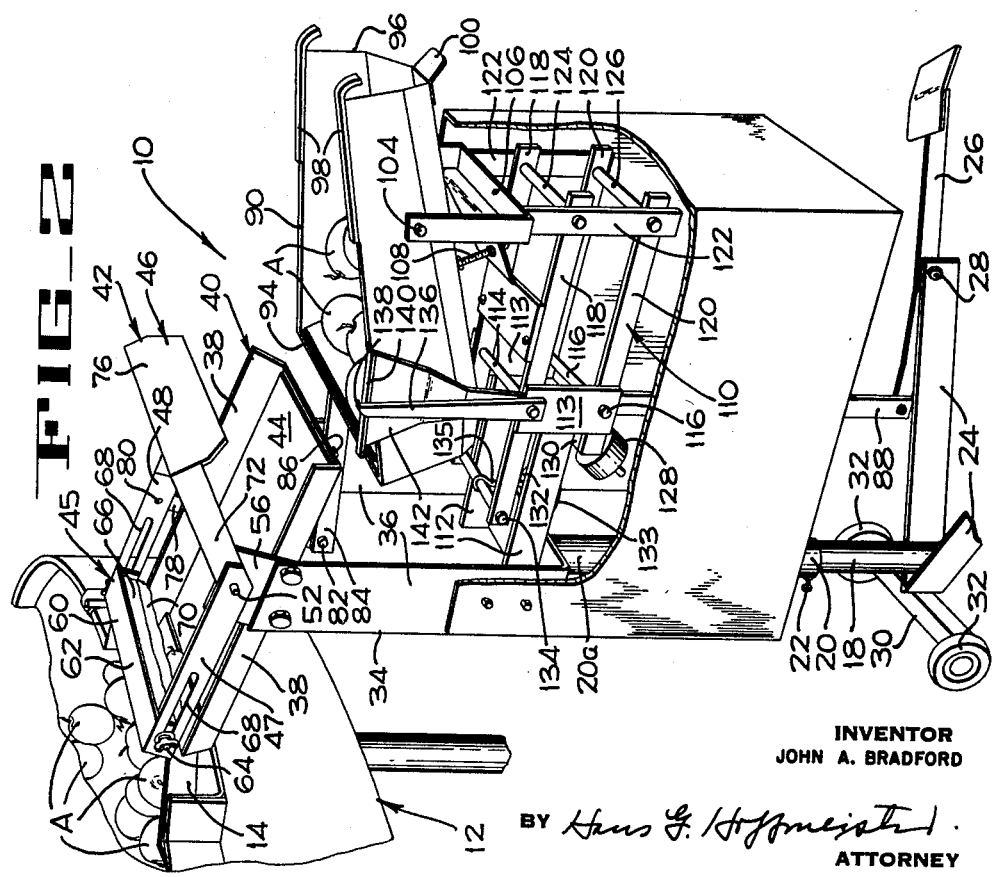
INVENTOR
JOHN A. BRADFORD
BY Hans G. Hoffmeister
ATTORNEY

250/ 151/10

United States Patent Office 3,155,183
Patented Nov. 3, 1964

3,155,183
BAGGING MACHINE
John A. Bradford, Yakima, Wash., assignor to FMC Corporation, San Jose, Calif., a corporation of Delaware
Filed Apr. 6, 1962, Ser. No. 185,697
5 Claims. (Cl. 177—162)

The present invention pertains to apparatus for weighing and bagging articles, such as apples and the like.

Heretofore it has been considered necessary to employ a more or less complex and expensive weighing mechanism to weigh groups of random size articles so that each group has the same weight as the others. Thus, the usual weighing and bagging machine is often characterized by a high initial cost and by mechanism requiring extensive maintenance.

The weighing machine of the present invention eliminates the usual weighing operation by assembling the fruit in groups in a single layer covering a predetermined area and using the area covered by the fruit as an indication of the weight. Thus, a simplified mechanism is provided which achieves the same results as the usual weighing operation.

An object of the present invention is to provide an improved machine for weighing random size articles in groups.

Another object of the present invention is to provide an improved and simplified mechanism for weighing fruit or vegetables of generally uniform size.

Another object of the invention is to provide a weighing and bagging mechanism in which the weight determination of the required number of articles of random size to produce the desired group weight is based upon the area a single layer of articles will occupy.

Another object of this invention is to provide a mechanism for assembling and bagging successive uniform weight groups of articles and which is capable of determining the weight of one group of articles while the preceding weighed group of articles is being discharged in a container.

Other objects and advantages of the present invention will become apparent from the following description, and from the accompanying drawings in which:

FIGURE 1 is a perspective of the fruit weighing and bagging machine of the present invention, and a portion of a cooperating fruit sorting table for supplying size-graded fruit to the machine.

FIGURE 2 is a fragmentary perspective similar to FIGURE 1 but illustrating a subsequent operational position of the weighing and bagging machine of the present invention.

FIGURE 3 is a schematic elevation, partly broken away, of the weighing and bagging machine shown in FIGURES 1 and 2.

One embodiment of the weighing machine 10 of the present invention is illustrated in FIGURE 1 as adapted to receive fruit from a conventional fruit sorting table 12. The fruit sorting table 12 delivers random size fruit A, that have been previously sorted so that all fruit are approximately of the same size, to a discharge outlet 14 of the fruit sorting table 12. The sorting table forms no part of the present invention and its sole function is to supply the size-graded fruit A to the weighing machine 10. Other types of fruit supply means, such as a gravity chute or a conveyor, can be used to deliver the fruit to the weighing machine 10.

The machine 10 is supported on a shaft 18 having a tubular sleeve 20 mounted thereon and locked at a selected elevation by means of a locking screw 22. The shaft 18 is stabilized by a pair of diverging legs 24 which are welded to its lower end. As will appear later in this description, the entry and discharge of fruit in the weighing and bagging machine 10 is controlled by a foot-operated lever 26 which is pivoted at 28 to one of the legs 24.

In order to facilitate movement of the machine 10 to various locations in the packing plane, as may be required, the machine is provided with wheels 32 that are rotatably mounted on an axle 30 which is welded to the legs 24 at their juncture. By tilting the machine, the wheels provide its sole support, and the machine can then be wheeled from place to place.

The upper end 20a (FIG. 2) of the tube 20 is welded to the horizontal portion of a U-shaped support bracket 34 which carries all of the components of the machine. At its upper end the support bracket 34 carries an elongated fruit-collection chute in the form of a trough 40 which has two side walls 38, each of which is bolted to an upwardly extending arm 36 of the bracket 34. The chute 40 has open upper and lower ends which are adapted to be alternately opened or closed by a pivotally mounted gate assembly 42 that is controlled by the operator through actuation of the foot lever 26. The chute declines in a direction away from the sorting table 12 so that the fruit discharged from the table rolls forwardly in the chute. To prevent bruising of the fruit rolling into the chute 40, the bottom wall of the chute is covered with a resilient protective mat 44.

The gate assembly 42 includes an upper gate mechanism 45 and a lower gate mechanism 46. The upper gate mechanism 45 comprises two gate arms 47 and 48 which project toward the upper or inlet end of the fruit collection chute 40 from associated pivot pins 52 and 54. The pivot pins 52 and 54 are fixed in plates 56 and 58, respectively, that are secured between the side walls 38 of the chute 40 and the arms 36 of the support bracket 34 by the bolts which secure the chute to the arms 36.

Entry of fruit into the upper end of the chute 40 is controlled by a gate 60 which includes an inverted U-shaped strap 62 that is adjustably secured to the gate arms 47 and 48 by means of a threaded rod 64 which projects through the downturned end portions of the strap 62 and through a block 66 which is positioned between the end portions of the strap. The rod 64 projects through a slot 68 in each gate arm and is locked to the arms by wing nuts on each end of the rod. To stop the flow of fruit into the collection chute 40, the gate 60 is swung downwardly to close the upper end of the chute. To protect the fruit when the gate is lowered, a thick resilient pad 70 is secured to the lower surface of the block 66.

The lower gate mechanism 46 includes a pair of gate support arms 72 and 74 that are welded to the associated upper gate arms 47 and 48 and project downstream toward the discharge end of the fruit collection chute 40. A transverse gate 76 is secured to the free ends of the lower gate arms whereby pivoting movement of the arms about pins 52 and 54 will cause the gate 76 to open or close the discharge end of the fruit collection chute 40. The lower arms 72 and 74 are transversely aligned, and each arm forms an obtuse angle with its associated upper gate arm 47 or 48 so that when the gate assembly 42 is pivoted about the pivot pins 52 and 54, by actuation of the foot lever 26, to lower the free ends of one pair of gate arms, the free ends of the other pair of gate arms are elevated a substantial distance above the fruit collection chute 40. In this manner the fruit will be alternately admitted into the fruit collection chute 40 by the upper gate 60 and then discharged from the lower end of the chute by the gate 76.

In the absence of control by the operator, the fruit gate assembly 42 is biased toward its FIGURE 1 position. In this position the chute is open to receive fruit at at its upper end but is closed at the lower end to prevent the escape of fruit. The gate biasing means are provided by a series of pivotally interconnected links which include a short upper link 78 (FIGS. 2 and 3) which is pivoted at 80 to the upper gate arm 48, and is pivoted at 82 to a generally horizontal link 84. The link 84 is pivotally mounted upon a pivot pin 86 intermediate its ends, and the pivot pin is fixed to the adjacent upright arm 36 of the U-shaped bracket 34. The other end of the link 84 is pivoted to an elongate, generally vertical bar 88 which is pivotally connected to the adjacent end portion of the foot lever 26.

Since the foot lever 26 is very nearly balanced about its pivot axis at 28, when the foot lever is not depressed, the elongated bar 88 pulls downwardly on one end of the link 84 and causes the link 78 to pivot the gate assembly 42 to its FIGURE 1 position wherein the lower, discharge end of the fruit collection chute 40 is closed.

When the operator presses the foot lever 26 the gate assembly 42 pivots to lower the upper gate 60 and raise the lower gate 76 from its sealing position across the lower end of the chute 40. Thus, the group of fruit which has rolled into the fruit collection chute 40 (FIG. 1) while the foot lever 26 was unactuated, is discharged from the chute 40 and drops into a hopper 90.

The hopper 90 has a closed end provided by a wall 94 adjacent the fruit collection chute 40, and an open discharge end 96 which is provided with a curved bag guide strap 98 on the upper edge of each side wall of the hopper. In conjunction with a third bag guide tab 100 on the bottom wall of the hopper, the straps 98 facilitate the placing of the open mouth of a bag (not shown) over the discharge end of the hopper in a manner well known in the art. The straps also form convenient palm rests for the operator so that he may hold the bag in place on the mouth of the hopper, and means by which the hopper can be tilted to its discharge position by depressing its open end.

The hopper 90 is pivotally mounted near its discharge end upon stub shafts 104 (only one being shown) to the upwardly projecting arms of a yoke 106 which is supported by a parallelogram linkage arrangement. The hopper 90 is overbalanced toward its closed end so that it always rests against a stop bolt 108 on the yoke 106 unless the operator pivots the hopper clockwise (FIG. 3) to its dumping position by pressing down upon the arcuate straps 98. The yoke 106 is part of a scale mechanism 110 which is provided to check the weight of each group of fruit deposited into the hopper 90.

It is important to note that the scale mechanism 110 is not provided to initially weigh the group of fruit entering the weighing and bagging machine 10, but is provided for the sole purpose of checking the measured quantity of fruit. The check weighing operation and its relation to the over-all weighing and bagging operation will be explained in detail presently.

Included in the scale mechanism 110 are two scale support brackets 112 that are each secured to the horizontal portion of the U-shaped bracket 34. Each bracket 112 has a vertically extending end plate 113 which rotatably supports the adjacent end portion of two superposed shafts 114 and 116. Shafts 114 and 116 respectively project through, and are secured to, a pair of upper scale levers 118 and a pair of lower scale levers 120. Adjacent the yoke 106, the scale levers 118 and 120 at each side of the machine are pivotally interconnected by a leg 122, which depends from the yoke 106, and by two superposed pivot shafts 124 and 126 that project through the two legs 122 and the upper and lower scale levers 118 and 120, respectively.

An adjustable counterweight 128 is carried by a transverse rod 130 which interconnects the rear end portions of the lower scale levers 120 near the pivot shaft 116. The purpose of the counterweight is to cancel out the weight of the hopper 90 and its various support members so that the weight of the fruit in the hopper can be accurately and rapidly measured by a relatively small group of scale weights 132. The weights 132 are removably positioned on a plate 133 that is carried at the lower end of a rod 135 whose upper end is pivoted on a transverse rod 134 which is secured at both ends to the upper scale levers 118.

One end portion of the pivot shaft 114 is secured to an indicator arm 136. Since vertical movement of the parallelogram linkage formed by levers 118 and 120 rotates the shaft 114, the indicator arm 136 is moved during deflecting movement of the linkage and its inturned, pointed, upper end 138 traverses an adjacent horizontal flange 140. The flange is part of a plate 142, the lower end of which is secured to the adjacent scale support bracket 112. A central zero mark (not shown) is marked on the flange 140 and indicates, when the hopper 90 contains a group of fruit discharged from the fruit collection chute 40, and when the pointed end 138 of the indicator arm 136 is on the zero mark, that the weight of the fruit is correct. If the weight is more or is less than the correct weight, the indicator arm will be at one or the other end of the flange 140, and will accordingly indicate the group of fruit is "plus" or "minus" from the desired weight.

When initially placed in operation, the fruit bagging machine 10 is first adjusted, by means of post 20, to the proper elevation to receive fruit into the open upper end of the fruit collection chute 40 from whatever fruit delivery means is utilized. It is preferable, but not mandatory, that the incoming fruit has been size graded. In any event, the fruit must be randomly mixed so that there is no concentration of any one size of fruit.

Prior to the time the operator actuates the foot pedal 26 (FIG. 1), the fruit A rolls into and fills the fruit collection chute 40 because the linkage interconnecting the gate assembly 42 and the foot pedal biases the gate assembly to maintain the upper, inlet gate 60 open and the lower, discharge gate 76 closed.

The operator then actuates the foot pedal 26 which causes the inlet gate 60 to press down upon the fruit immediately below the gate. Since the resilient pad 70 on the lower surface of the gate 60 is relatively thick, the pad easily deforms over the largest fruit it contacts and yet contacts the smallest fruit thereunder. Because the discharge gate 76 opens when the inlet gate closes, all fruit downstream of the inlet gate 60 rolls out of the fruit collection chute 40 by gravity and drops into the hopper 90.

The loaded hopper causes the scale mechanism 110 to be actuated and the upper end 138 of the indicator arm 136 either indicates the weight is correct by moving to a position opposite the zero mark on flange 140, or indicates that the group is over or under weight. If the arm 136 indicates that the group is overweight, the inlet gate 60 is adjusted toward the axis defined by pivot pins 52 and 54 so that fewer articles can be trapped between the gates when the next group is allowed to enter the collection chute 40. If the charge is underweight, the gate 60 is moved away from the pivot axis. The weighed group of fruit in the hopper may then be replaced on the sorting table 12, and a new group of fruit discharged into the hopper. The same weight checking operation is then made on that group of fruit, and on successive groups, until the inlet gate 60 is so adjusted that the zero reading is approximated with every group.

In actual practice, experienced fruit handlers very quickly determine the proper setting for the adjusted position of the inlet gate 60 according to the average size of fruit being delivered into the weighing and bagging machine 10. When the machine is in production line use, the occasional over or under weight bag is easily corrected by manually adding one of the fruit from the fruit collection chute 40 to the hopper, or by removing a fruit from the chute.

The novel weighing machine of the present invention is based on the concept that, if each of two groups of random size articles covers the same chute area, the weights of the two groups are substantially identical. This concept, as embodied in the weighing and bagging machine 10 of the present invention, proves out well in practice and makes possible a simple and effective mechanism for bagging any produce or product which will roll. It is to be noted that an important feature of the bagging machine 10 is that the bag loading charge of fruit assembled in the fruit collection tray 40 is related to the area a single layer of pre-sized fruit will occupy, and is only indirectly related to the number of fruit because the number of fruit will vary since the fruit is of different sizes. Thus, while counting chutes and volumetric chutes are old in the filling machine art, it is believed that the present apparatus for successively assembling articles into groups having substantially uniform weight, as a function of the area a group having the desired weight will occupy in a single layer, provides a notable advance in the art by making possible the greatly simplified and inexpensive weighing and bagging machine 10.

While a particular embodiment of the present invention has been shown and described, it will be understood that the weighing and bagging machine 10 is capable of modification and variation without departing from the principles of the invention and that the scope of the invention should be limited only by the scope and proper interpretation of the claims appended hereto.

The invention having thus been described, that which is believed to be new and for which protection by Letters Patent is desired, is:

1. In a fruit bagging machine the combination comprising an inclined fruit collection chute having open upper and lower ends, a pivotable gate assembly mounted over said chute and provided with an upper gate and a lower gate adapted to close the open upper and lower ends of said chute in alternate sequence upon pivotal movement of said gate assembly, adjustment means mounting one of said gates for movement toward or away from the opposite gate, and a lever mechanism connected to said gate assembly for pivoting said gate assembly.

2. In a fruit bagging machine the combination comprising a fruit collection chute having side walls and open upper and lower ends, a pivotable gate assembly mounted over said chute, said gate assembly having an upper gate and a lower gate adapted to alternately close said upper and lower ends of said chute, means adjustably mounting one of said gates for varying the distance between said upper and lower gates, a pedal, and actuating means connected to said pedal and normally biasing the same to a position in which said lower gate blocks the lower end of said fruit collection chute, said pedal when depressed both raising said lower gate and lowering said upper gate.

3. A machine for bagging fruit in groups of substantially uniform weight comprising an inclined fruit collection chute having side walls and open inlet and outlet ends, a support bracket secured to said side walls, a gate arm pivotally connected intermediate its ends to said support bracket for movement about a horizontal axis, a first gate carried by said gate arm for opening and closing the outlet end of said chute, a second gate carried by said gate arm for opening and closing the inlet end of said chute, the area of said chute between said gates defining a fruit collecting zone, said first and second gates being so arranged that when one end of said chute is open its opposite end is closed, a pad of resilient material carried by said second gate and extending across the undersurface thereof, said pad being movable downwardly into contact with articles adjacent the inlet end of said chute to prevent their movement into said fruit collection zone, adjustment means mounting one of said gates to said gate arm for varying the distance between said first and second gates, a pedal, and actuating linkage connected to one of said gate arms for effecting pivotal movement of said gates whereby the outlet end of said chute is opened and the inlet end of said chute is closed.

4. A machine for weighing and bagging fruit comprising a fruit collection chute having an open upper inlet end and an open lower discharge end, an upstanding side wall at each side of said chute, a support bracket secured to said side walls, a gate arm pivotally connected intermediate its ends to said support bracket for movement about a horizontal axis, a first gate carried by one end of said gate arm and adapted to be swung between positions opening and closing the discharge end of said fruit collection chute, a second gate carried by the other end of said gate arm and adapted to be swung thereby to a position opening the inlet end of said chute when said first gate is closed, and to a position closing the upper end of said chute when said first gate is open, a pad of resilient material secured to said second gate and extending across the lower surface thereof to engage fruit adjacent said chute inlet end and prevent the entry of the engaged fruit into said chute, means adjustably mounting one of said gates to said gate arm for varying the distance between said first and second gates, a receiving hopper mounted adjacent the discharge end of said chute, said hopper having a closed end adjacent said chute and an open opposite end, a weighing scale supporting said hopper near its open end for pivotal movement about an axis parallel to said gate axis, scale support means interconnecting said scale and said support bracket, and gate actuating linkage connected to said gate arm and biasing said gate arm toward a position wherein said first gate closes the lower end of said fruit collection chute, a pedal connected to said linkage and arranged when depressed to simultaneously open said first gate and close said second gate whereby the chute is contemporaneously opened to receive a new charge of fruit and the fruit in said chute is discharged into said hopper.

5. A machine for weighing batches of fruit of random size and shape comprising an open-ended inclined chute including a flat floor and spaced side walls, said floor being of a width and length suitable for accommodating a layer of fruit which extends transversely of said floor for a distance equal to the combined width of several fruit, a first gate movable between a position closing the lower discharge end of said inclined chute to retain a layer of fruit in said chute and a position spaced from the lower end of the chute to permit discharge of the layer of fruit, a second gate moveable between a position spaced from the upper inlet end of said chute to a position extending across said inlet end to restrict entry of fruit into said chute, a resilient pad secured to said second gate and adapted to move downwardly into engagement with fruit adjacent said inlet end to contact the fruit and prevent it from entering said chute, the area of said floor defined by said side walls and said gates being effective to provide a weighing zone of fixed size in which a layer of fruit of random size and shape may be collected, and means for forming successive layers of fruit in said zone, each layer having substantially the same weight as the layer previously formed in said zone.

References Cited in the file of this patent

UNITED STATES PATENTS

| 590,635 | Sturtevant | Sept. 28, 1897 |
| 2,586,557 | Newbold | Feb. 19, 1952 |
| 2,656,962 | Daniels | Oct. 27, 1953 |
| 2,915,217 | Chaplinski | Dec. 1, 1959 |